(12) United States Patent
Salim

(10) Patent No.: US 11,843,551 B2
(45) Date of Patent: Dec. 12, 2023

(54) FLEXIBLE NR-U WIDEBAND OPERATION

(71) Applicant: JRD COMMUNICATION (SHENZHEN) LTD., Guangdong (CN)

(72) Inventor: Umer Salim, Nanterre (FR)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 136 days.

(21) Appl. No.: 17/265,190

(22) PCT Filed: Sep. 24, 2019

(86) PCT No.: PCT/CN2019/107523
§ 371 (c)(1),
(2) Date: Feb. 1, 2021

(87) PCT Pub. No.: WO2020/063586
PCT Pub. Date: Apr. 2, 2020

(65) Prior Publication Data
US 2021/0306117 A1    Sep. 30, 2021

(30) Foreign Application Priority Data
Sep. 26, 2018 (GB) ...................... 1815700

(51) Int. Cl.
*H04L 5/00* (2006.01)
*H04W 72/0453* (2023.01)
(Continued)

(52) U.S. Cl.
CPC ............ *H04L 5/001* (2013.01); *H04L 5/0053* (2013.01); *H04L 5/0094* (2013.01);
(Continued)

(58) Field of Classification Search
CPC ........... H04W 72/042; H04W 72/0446; H04W 72/0453; H04W 74/0808; H04W 72/23;
(Continued)

(56) References Cited

U.S. PATENT DOCUMENTS

2010/0238821 A1    9/2010  Liu et al.
2010/0246489 A1*   9/2010  Yang ..................... H04L 5/0094
                                                                   370/328
(Continued)

FOREIGN PATENT DOCUMENTS

| CN | 108401245 A  | 8/2018 |
| EP | 3 018 858 A1 | 5/2016 |
| GB | 2 504 544 A  | 2/2014 |

OTHER PUBLICATIONS

"Channel access procedures for NR-U", Samsung, 3GPP TSG-RAN WG1 Meeting #94, R1-1808768, Aug. 2018.
(Continued)

*Primary Examiner* — Kevin C. Harper
(74) *Attorney, Agent, or Firm* — PV IP PC; Wei Te Chung; Zhigang Ma

(57) ABSTRACT

Methods of data communication in a cellular communications network based on an unlicensed wideband carrier, the method performed by a base station of the cellular communications network, the base station being in communication with one or more mobile devices. The methods comprise the steps of determining a set of used sub-bands of the plurality of sub-bands available for data transmission, generating used sub-band control information pertaining to a plurality of sub-bands in the wideband carrier based on the set of used sub-bands, and providing the used sub-band control information to the one or more mobile devices.

16 Claims, 6 Drawing Sheets

(51) Int. Cl.
*H04W 72/23* (2023.01)
*H04W 72/0446* (2023.01)
*H04W 16/14* (2009.01)

(52) U.S. Cl.
CPC ... *H04W 72/0446* (2013.01); *H04W 72/0453* (2013.01); *H04W 72/23* (2023.01); *H04L 5/0048* (2013.01); *H04W 16/14* (2013.01)

(58) Field of Classification Search
CPC .. H04W 72/231; H04W 72/232; H04L 5/001; H04L 5/0092; H04L 5/0053; H04L 5/0094
See application file for complete search history.

(56) References Cited

U.S. PATENT DOCUMENTS

| | | |
|---|---|---|
| 2013/0170468 A1 | 7/2013 | Baker et al. |
| 2019/0268883 A1* | 8/2019 | Zhang .................. H04L 5/0094 |
| 2020/0092913 A1* | 3/2020 | Xu ........................ H04L 5/0048 |
| 2020/0404699 A1* | 12/2020 | Zheng .................... H04L 5/001 |
| 2021/0235491 A1* | 7/2021 | Iyer .................... H04W 72/042 |

OTHER PUBLICATIONS

"Frame structure for NR-U", Ericsson, 3GPP TSG-RAN WG1 Meeting #93, R1-1806250, May 2018.

* cited by examiner

| Priority class | MCOT (ms) | CWS |
| --- | --- | --- |
| 1 | 2 | {3, 7} |
| 2 | 3 | {7, 15} |
| 3 | 8 or 10 | {15, 31, 63} |
| 4 | 8 or 10 | {15, 31, 63, 127, 255, 511, 1023} |

Figure 1

FLEXIBLE NR-U WIDEBAND OPERATION

CROSS-REFERENCE TO RELATED APPLICATIONS

This application is a National Stage of International patent application PCT/CN2019/107523, filed on Sep. 24, 2019, which claims priority to foreign Great Britain patent application No. GB 1815700.8 filed Sep. 26, 2018, the disclosures of which are incorporated by reference in their entirety.

TECHNICAL FIELD

The following disclosure relates to wireless communication systems operating in unlicensed bands. In particular, the following disclosure relates to facilitation of better use of wideband carriers in an unlicensed medium, for example by cellular operators.

BACKGROUND

Wireless communication systems, such as the third-generation (3G) of mobile telephone standards and technology are well known. Such 3G standards and technology have been developed by the Third Generation Partnership Project (3GPP). The 3rd generation of wireless communications has generally been developed to support macro-cell mobile phone communications. Communication systems and networks have developed towards a broadband and mobile system.

In cellular wireless communication systems User Equipment (UE) is connected by a wireless link to a Radio Access Network (RAN). The RAN comprises a set of base stations which provide wireless links to the UEs located in cells covered by the base station, and an interface to a Core Network (CN) which provides overall network control. As will be appreciated the RAN and CN each conduct respective functions in relation to the overall network. For convenience the term cellular network will be used to refer to the combined RAN & CN, and it will be understood that the term is used to refer to the respective system for performing the disclosed function.

The 3rd Generation Partnership Project has developed the so-called Long Term Evolution (LTE) system, namely, an Evolved Universal Mobile Telecommunication System Territorial Radio Access Network, (E-UTRAN), for a mobile access network where one or more macro-cells are supported by a base station known as an eNodeB or eNB (evolved NodeB). More recently, LTE is evolving further towards the so-called 5G or new radio (NR) systems where one or more cells are supported by a base station known as a next generation NodeB (gNB). NR is proposed to utilise an Orthogonal Frequency Division Multiplexed (OFDM) physical transmission format.

Due to the growing requirements of data rates, QoS, and enormous increase in the number of connecting devices, it has become clear that unlicensed spectrum is going to be ever more important. There are very wide bandwidths available in unlicensed bands which are available to devices and systems with varying levels of transmission constraints in different geographical regions. Rel-15 of 5G NR, has standardized the licensed operation. This has permitted the use of configurable sub-carrier spacings (SCS), configurable transmission time intervals (TTIs), and configurable Hybrid-ARQ (HARQ) timings, to name but a few of the important techniques which, when combined with very wide-bandwidth channels, transmissions in mm-wave spectrum, massive MIMO, and hybrid beam-forming technologies, promise huge advantages for any given metric of interest. This has also spurred the investigation on how to best use the unlicensed spectrum and how to suitably employ the NR standardized techniques in unlicensed bands.

Listen-before-talk (LBT) is adopted as the fundamental coexistence mechanism for License Assisted Access (LAA), whereby a radio transmitter is required to apply a clear channel assessment (CCA) check prior to transmission. CCA involves at least energy detection (ED) over a time duration with a certain threshold (ED threshold) to determine if a channel is occupied or is clear. If the channel is occupied, random back-off within a contention window applies, so that there is a minimum time duration where the channel is clear before the transmitter can transmit. In order to protect Wi-Fi ACK transmissions, a defer period (e.g. 43 μs for best effort traffic) is applied after each busy CCA slot before resuming back-off. After the transmitter has gained access to the channel, the transmitter is only allowed to transmit for a limited duration referred to as the maximum channel occupancy time (MOOT). To provide differentiation to channel access priorities based on the type of traffic served (e.g. VoIP, video, best effort, or background), four LBT priority classes are defined with different contention window sizes (CWS) and MOOT. FIG. 1 shows Channel Access Priority Classes for DL and summarizes the MOOT and CWS for the four priority classes. It is noted that the defer period is different for different priority classes and that details are omitted from FIG. 1 for brevity. Further, MOOT of 8 ms for priority classes 3 and 4 is used in the presence of other technology, whereas MOOT of 10 ms is used otherwise.

Compared to LTE, NR supports wideband operation. The maximum channel bandwidth per NR carrier is 100 MHz for <6 GHz and 400 MHz for 6-52.6 GHz, and the maximum number of NR carriers for CA and DC is 16 in phase 1. In 5 GHz unlicensed band, one or multiple of 20 MHz channels can be aggregated for transmission. Since NR supports wider bandwidth, and extremely wide bandwidths are available in unlicensed spectrum in higher frequencies, NR-U operation may have significant advantage in supporting the large bandwidths. The 6 GHz unlicensed spectrum may follow a similar channelization as in 5 GHz. NR-U operation wider than 20 MHz would require performing LBT in each of the 20 MHz channels. There are various alternatives in performing LBT across multiple 20 MHz channels, and whether the multiple channels are contiguous or not affects the ways LBT can be performed.

For instance, in WiFi technology based on 802.11n amendment two 20 MHz channel can be aggregated, and based on 802.11ac amendment two, four or eight 20 MHz channels can be aggregated. The aggregated channels are contiguous. And the LBT procedure is a nested procedure where a main set of channels, denoted as primary channels, should complete a successful LBT otherwise the whole aggregated channel is considered unavailable. Most of the reasons for contiguous channels and the specific wideband LBT is due to operation of 802.11 devices and they are not rooted in any regulatory rule.

Sub-band LBT could be used to support wider bandwidth operation in NR-U. In this scheme, the operating bandwidth is split into multiple sub-bands and LBT is carried out individually on each sub-band. Usually, the sub-band is set as the minimum operating bandwidth in target frequency band for the sake of coexistence. Multi-channel LBT in LTE LAA is a typical example where each sub-band is 20 MHz in 5 GHz bands. It is possible to support transmission on a sub-band of the carrier operating on a wider bandwidth, hence achieve high channel access opportunity. Considering the power consumption, LBT is usually carried out in time domain for each sub-band. The computational complexity will increase with the number of sub-bands linearly. Taking 20 MHz as the bandwidth of a sub-band, 8 LBT attempts for 160 MHz operation carrier is needed every 9 μs in 5 GHz. The computational load could be overwhelming while the LBT attempt times reach to 32 if the number of CC increases to 4.

Wideband LBT, in contrast, can be used to reduce the complexity of LBT for wider bandwidth operation. For example, in 5 GHz Wi-Fi systems, if energy detection (CCA-ED) on wideband of 40 MHz and 80 MHz are taken on the preconfigured secondary channels, at most 4 ED attempts will be taken per time slot of 9 μs assuming the same 160 MHz operating bandwidth. In order to facilitate wideband LBT, standard effort on channelization for each channel bandwidth is required to avoid interfering sub-band transmission. On the other hand, interference on sub-bands could also block the transmission on the whole wide band, which decreases the system performance.

When all the sub-bands are found to be available or all the sub-bands are found to be busy, the wideband operation is simpler. The network uses the medium when the wideband carrier (all the sub-bands are available) and it continues with the LBT processing to find a transmission opportunity in future. This scenario is illustrated in FIG. 2, which shows symmetric LBT results over sub-bands of a wideband carrier.

Even when a device plans a wideband operation on the unlicensed carrier and it starts from a wideband LBT, in case of failure, it can switch to sub-band processing (sequentially or simultaneously) to identify if there are sub-bands within the wideband carrier available for operation. It may be inefficient not to use the whole wideband carrier if only a subset of sub-bands within this wide BW are occupied by incumbent devices.

Independent of the LBT framework (i) whether a smaller granularity LBT like over 20 MHz carried out multiple times to achieve a large BW LBT or (ii) a single wideband LBT carried out first and upon failure, smaller granularity LBTs conducted showing some available sub-bands, the base station ends up with a situation where some of the sub-bands are found to be available for transmission and some others which are found to be occupied by other devices and hence unusable for transmission. This situation is depicted in FIG. 3, which shows asymmetric LBT results over sub-bands of a wideband carrier. In FIG. 3, a wideband carrier of 80 MHz has been configured for the users, comprising four sub-bands of 20 MHz. FIG. 3 (a) shows two higher sub-bands to be available and two lower sub-bands not available. FIG. 3 (b) shows a different setting of the availability of sub-bands with alternate sub-bands available for transmission. FIG. 3 (c) shows the case where only one sub-band ($2^{nd}$ from the bottom) is not available in the wideband carrier.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided a method of data communication in a cellular communications network based on an unlicensed wideband carrier. The method is performed by a base station of the cellular communications network, the base station being in communication with one or more mobile devices. The method includes the steps of: determining a set of used sub-bands of the plurality of sub-bands available for data transmission; generating used sub-band control information pertaining to a plurality of sub-bands in the wideband carrier based on the set of used sub-bands; and providing the used sub-band control information to the one or more mobile devices.

Determining the set of used sub-bands of the plurality of sub-bands available for data transmission may include determining the set of used sub-bands based on selecting a sub-set of the set of available sub-bands, optionally based on a pattern of available and unavailable sub-bands of the plurality of sub-bands.

Providing the used sub-band control information to the one or more mobile devices may include: generating downlink control information (DCI) including the used sub-band control information; and transmitting the DCI, optionally in a group-common manner.

Generating downlink control information (DCI) including the used sub-band control information may include configuring a common control resource set (CORESET) over the wideband carrier. The CORESET may encompass the set of available sub-bands.

Transmitting the DCI may be performed at the beginning of the channel occupancy time (COT). Transmitting the DCI may be repeated multiple times within the COT duration.

The method may further include restricting control channel elements (CCEs) to localized mapping without any interleaving. Transmitting the DCI may be based on the CCEs.

Transmitting the DCI may further include repeating the DCI in one or more sub-bands of the set of available sub-bands.

The method may further include restricting search spaces in the configured CORESET with a limited number of physical downlink control channel (PDCCH) candidates.

The DCI may be configured to include the information of the used sub-bands by indicating a row index of a mapping table in which the mapping table has different combinations of used sub-bands in each row.

The DCI may be configured to include the information of the used sub-bands in a bitmap-based signalling where each bit of the bitmap provides a usage status of a single sub-band in a current COT.

Providing the used sub-band control information to the one or more mobile devices may include: generating one or more preambles based on the set of used sub-bands; and transmitting the one or more preambles.

The one or more preambles may include a corresponding preamble for each sub-band of the set of available sub-bands.

Transmitting the one or more preambles may include transmitting a single type of preamble for each used sub-band in a current COT.

Generating the one or more preambles may be based on Zadoff-Chu sequences or m-sequences.

The one or more preambles may include a single preamble. The single preamble may include control information indicative of an active pattern of used sub-bands in a current COT.

The cellular communications network may be configured to transmit the single preamble based on resources which are aligned with synchronization signal block (SSB) transmission.

A root of the one or more preambles may stay the same for the base station. Different cyclic shifts may include control information indicative of an active pattern of used sub-bands in a current COT.

Determining the set of available sub-bands of the plurality of sub-bands available for data transmission may include performing channel sensing.

There is further provided a method of data communication in a cellular communications network based on an unlicensed wideband carrier. The method is performed by a base station of the cellular communications network, the base station being in communication with one or more mobile devices. The method may include the steps of: configuring one or more users with multiple bandwidth parts within the unlicensed wideband carrier; determining a set of available sub-bands of the plurality of sub-bands available for data transmission; and providing the control information to change the bandwidth part to one or more mobile devices.

The control information to change the bandwidth part may be a common information sent to all or a group of users.

There is further provided a method of data communication in a cellular communications network based on an unlicensed wideband carrier. The method is performed by a mobile device in communication with a base station of the cellular communications network. The method includes the steps of: receiving used sub-band control information pertaining to a plurality of sub-bands in the wideband carrier; determining a set of available sub-bands available for data transmission based on the used sub-band control information; and transmitting data using one or more sub-bands of the set of available sub-bands.

The method may further include receiving downlink control information (DCI) including the used sub-band control information.

Receiving the DCI may further include receiving the DCI in one or more sub-bands of the set of available sub-bands, optionally repeatedly.

The method may further include receiving one or more preambles, the one or more preambles including the used sub-band control information.

There is further provided a non-transitory computer-readable medium. The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory.

The disclosed methods enable efficient use of the wideband carrier when not all of the sub-bands comprising the wideband carrier are available for transmission. In some embodiments, the disclosed methods are based on letting the initiating device, such as a base station, inform the other devices of its group, such as users in the cell, about which sub-bands of the unlicensed wideband carrier will be used for the transmission in the current transmission interval. In some embodiments, the method includes explicitly sending this control information to all the users. This can be achieved by sending this information in a common control signalling, like a common DCI, over one or a multiple of available sub-bands. To facilitate the quick and easy detection of this control signalling at the users without a huge requirement on blind decode capability, simple and finite mapping rules can be selected. In case when an anchor carrier is available, this control signalling (DCI) can be sent over the anchor carrier as well for further facilitating the users.

In some embodiments, the disclosed methods include sharing the information of available sub-bands of a wideband carrier through preamble transmission for each available sub-band. This can be combined with the transmission of simplified control signalling (for example common DCI) for improved reliability.

In some embodiments, the disclosed methods include using the control and data resources of the available sub-bands in a seamless manner as if they are contiguous resources even in the situations when they are non-contiguous. This results in improved spectral efficiency over the available resources.

Methods in accordance with the present disclosure, thus, include one or more of the following advantages:

Aggressive use of available unlicensed resources with wideband carriers in NR-U.

Improved spectral efficiency for control and data transmissions.

Informing the devices about the sub-bands with common signalling allows the minimization of resource overhead.

Better provisioning of paging and RACH resources and avoiding the control "outages".

Better time/frequency acquisition at the users with the shift of SSBs when their original positions fall inside or overlap with sub-bands which are not available for transmission in a wideband NR-U carrier.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. Like reference numerals have been included in the respective drawings to ease understanding.

FIG. 1 shows Channel Access Priority Classes for DL;

DETAILED DESCRIPTION OF THE PREFERRED EMBODIMENTS

Figure 2:
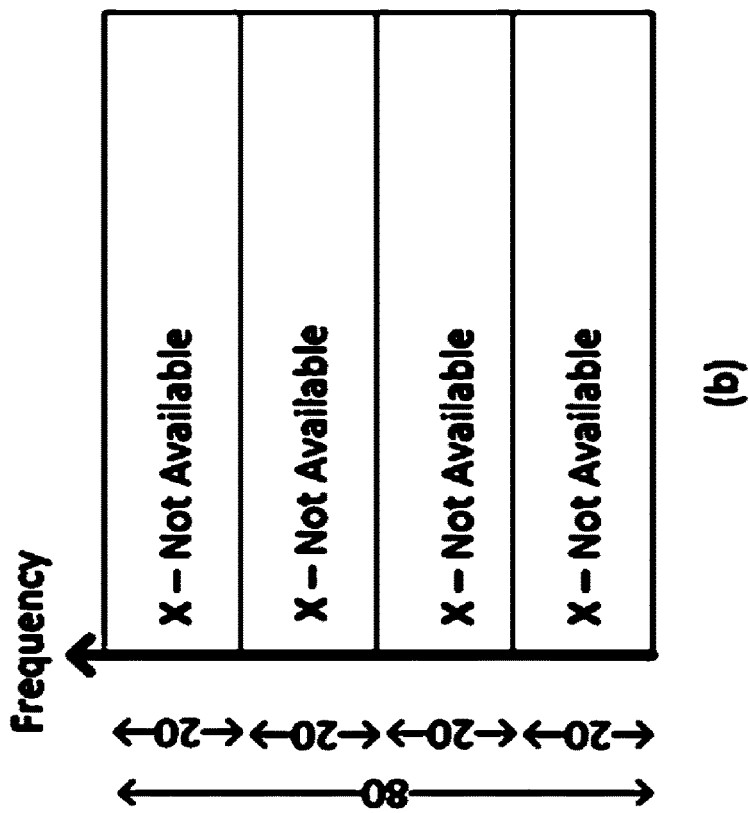
FIG. 2 shows symmetric LBT results over sub-bands of a wideband carrier.
Figure 2:
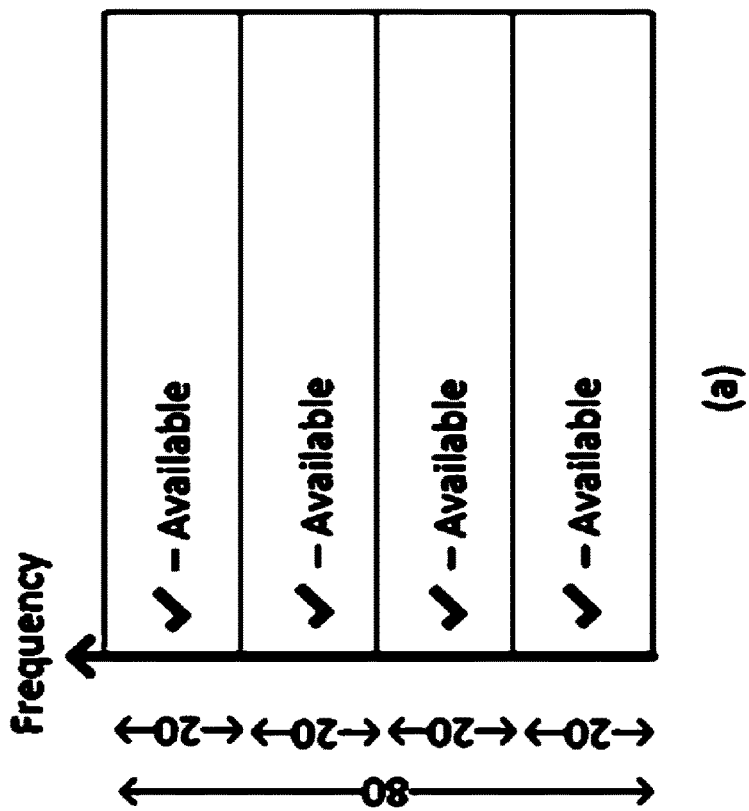
Figure 3:
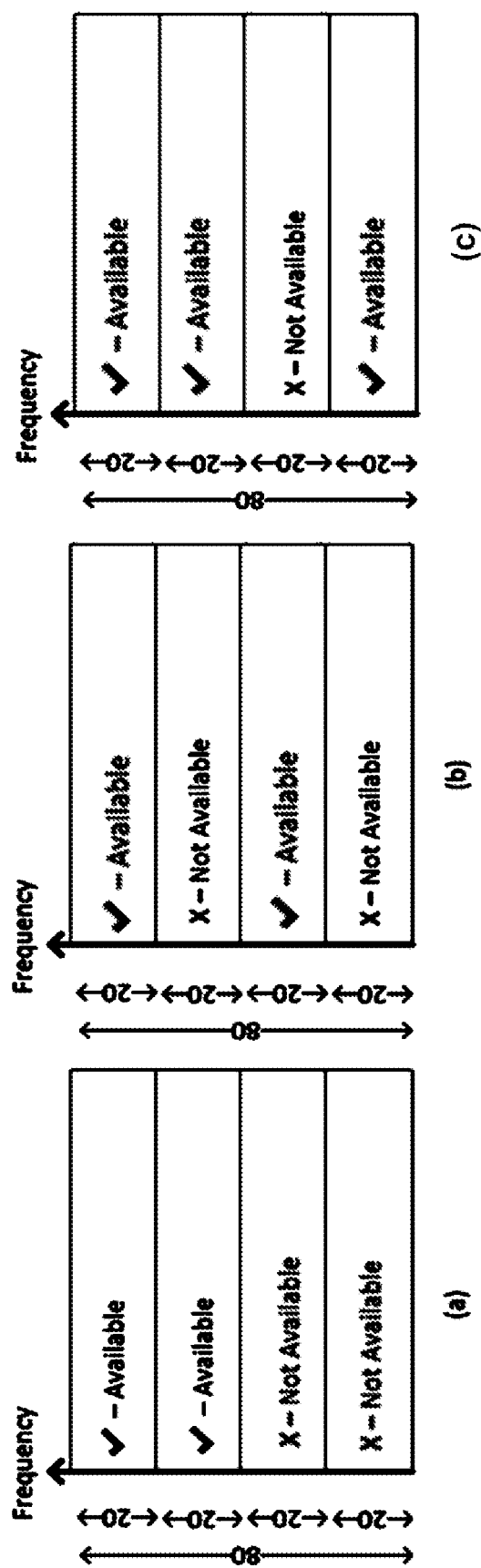
FIG. 3 shows asymmetric LBT results over sub-bands of a wideband carrier.

Those skilled in the art will recognise and appreciate that the specifics of the examples described are merely illustrative of some embodiments and that the teachings set forth herein are applicable in a variety of alternative settings.

As described above, when wideband operation is carried out in an unlicensed band, the uncertain availability of the unlicensed medium results in some special issues which were not existing for non-wideband operation. The root cause of the problem is that some devices may be operating in frequency bands of different sizes and hence if one or more of such devices occupy a subset of sub-bands comprising the wideband carrier for a device/network in question, it is not clear how this network can effectively operate with only a subset of sub-bands available from its wideband carrier.

A very simple solution to avoid such issues would be to not use the unlicensed wideband carrier if it's not available as a whole in a specific transmission interval. In other words, independent of how the LBT is carried out for wideband carrier (e.g., a base station may do a single LBT for the wide bandwidth or it may conduct multiple LBTs on sub-bands of the wideband carrier), the base station or network may decide as a rule that the carrier would be considered available for transmission only in those intervals when the whole of it is estimated to be available after LBT(s). If the carrier is found to be occupied partially or fully, the base station in question will keep looking for future opportunities when the wideband carrier is found to be completely available and will use the carrier in these cases. This simple approach would certainly simplify the network operation for the wideband carriers.

Unfortunately, this very simple solution is not really a solution because it is associated with very high cost and it will lead to very poor spectral and utilization efficiencies over the unlicensed carrier.

For this reason, it is proposed to use the wideband carrier even in occasions when not all of its sub-bands are or may be available for transmission. The utilization is relatively easier in those cases when the available group of sub-bands are contiguous, whereas it may become more intricate in cases when the group of available sub-bands are not contiguous to each other. Although not shown in detail, any of the devices or apparatus that form part of the network may include at least a processor, a storage unit, and a communications interface, wherein the processor unit, storage unit, and communications interface are configured to perform the method of any aspect of the present invention. Further options and choices are described below.

It is, thus, proposed that the base station uses the unlicensed wideband carrier even when only a subset of its sub-bands is found to be available in a certain occasion and irrespective of them being contiguous or non-contiguous.

Two approaches are proposed for managing the operation of unlicensed wideband carrier effectively when only a subset of its sub-bands is found to be available. The first approach is based on sending the control information about the used sub-bands of wideband carrier in the COT. The second approach is based on indicating the active sub-bands of wideband carrier in the COT with preamble(s). Both approaches are described here-below in detail.

The first approach is based on sending the control information about the used sub-bands of wideband carrier in the COT and includes explicitly conveying the control information about the used sub-bands, making up the wideband carrier. In general, all the sub-bands, constituting the wideband carrier, found to be available after the channel sensing operation may be used by the base station for uplink/downlink data transmissions. Though in certain cases, if the available sub-bands make a complicated pattern in the wideband carrier which may make it difficult to manage the operation, the base station may prefer to use even a subset of the available sub-bands. In that case, it indicates the set of sub-bands in the control information that it intends to use in this specific transmission occasion.

This information can be sent in a simplified DCI on the wideband carrier itself. As this information is useful to all of the users in the cell or a group of users who might be in the RRC_active state or a group formed with respect to another criterion, this control information should be transmitted in common or group-common manner. As this information will be most useful when the wideband carrier is not available for transmission as a whole, the strategy has to be devised to transmit this DCI such that it is decodable easily at the users even when a subset of sub-bands is used for its transmission. One method to achieve this is to configure the common CORESET over the wideband carrier, encompassing all the sub-bands. This would ensure that no matter which sub-band is found to be available, there is some resource for common CORESET. To further simplify the transmission of this common DCI and faster decoding at the UE side in partial available carriers, this DCI can be transmitted with certain restrictions on its location which can be restricted within sub-bands. As an example, as NR-U operation may see competing WIFI devices which might be operating over 20 MHz channels or integer multiples of it, the transmission of this simplified DCI can be restricted to sub-bands of 20 MHz. This would ensure the full transmission of this DCI even when a single sub-band is found to be available.

In one embodiment, the simplified DCI conveying the sub-band information can be sent in the beginning of the COT. On the other hand, it is possible that some of the UEs that the base station intends to communicate in this COT miss the initial DCI. This can happen for a number of reasons, e.g., if a UE fails to detect the start of the COT altogether, or if the deep channel fade does not let the UE decode successfully the simplified DCI etc. To reduce such events, the base station can configure the common CORESET periodicity such that it is present more than once in the COT duration and thus the simplified DCI with sub-band indication is repeated more than once within the COT duration. This will lead to better detection of used sub-bands and enable more effective operation on the wideband carrier.

There are further ways in which to simplify the detection and to improve the reliability of this common DCI. In one example, the control channel elements (CCEs) which are used to transmit the control information for this common DCI may be restricted to have only localized mapping without any interleaving. To reduce the burden of blind decoding attempts from the UEs, the search space for this common DCI can be restricted to have very few transmission opportunities and potentially only few aggregation levels allowed. This would facilitate users in the cell to quickly find out this common DCI, read about the available sub-bands of the wideband carrier and try to decode the relevant control and data information in the active sub-bands.

In another embodiment, in order to reduce the blind decode attempts and to improve the reliability of this common information, repeating this common DCI in multiple sub-bands can be employed. One example can be to repeat this common DCI on all the sub-bands which are used for the transmission on this wideband carrier. In case, this large resource consumption is not desired, a subset of the available sub-bands can be used for transmission under a certain rule. One example can be to send this information on alternate sub-bands.

Figure 4:
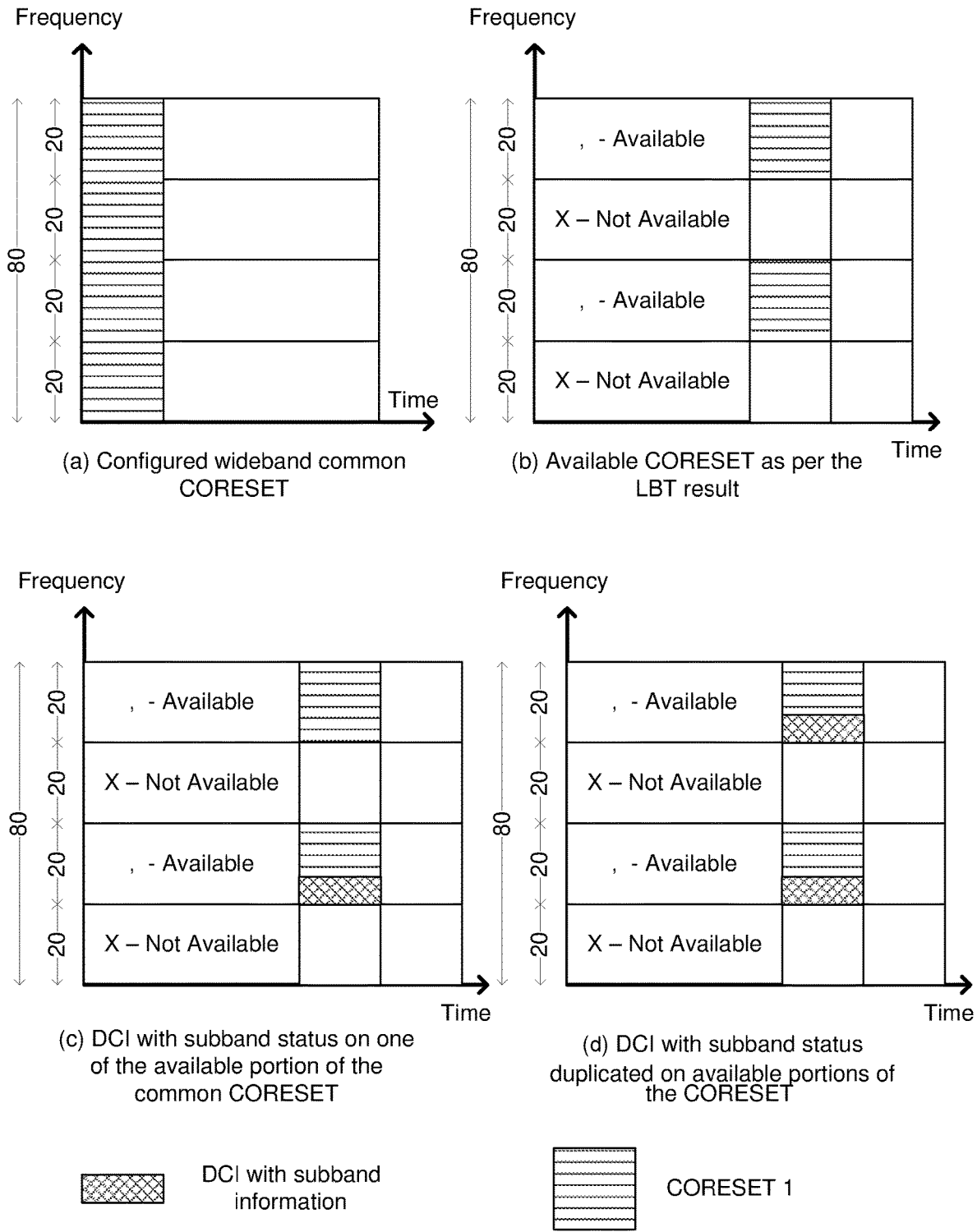
FIG. 4 shows example sub-band status information transmission using a wideband CORESET.

FIG. 4 shows one example configuration as per the previous description for a case where two of the 4 sub-bands are found to be available by channel sensing conducted at the base station. The base station has pre-configured the common CORESET encompassing the unlicensed wideband carrier as shown in FIG. 4 (a). FIG. 4 (b) shows the results of channel sensing on a specific occasion and as a consequence of this result, two non-contiguous sub-bands are available for transmission which also shows that two disjoint portions of the common CORESET are available. FIG. 4 (c) shows one example indication where the simplified DCI conveying the status of used sub-bands in the current transmission occasion is transmitted in one of the available portions. FIG. 4 (*d*) shows that the simplified DCI is repeated in all available sub-bands to improve the reliability and for a faster detection at the UEs. As mentioned previously, the base station can choose if to repeat the DCI in all or a subset of available sub-bands as a trade-off of overhead of repeated transmissions and reliability plus faster decoding advantage.

Figure 5:
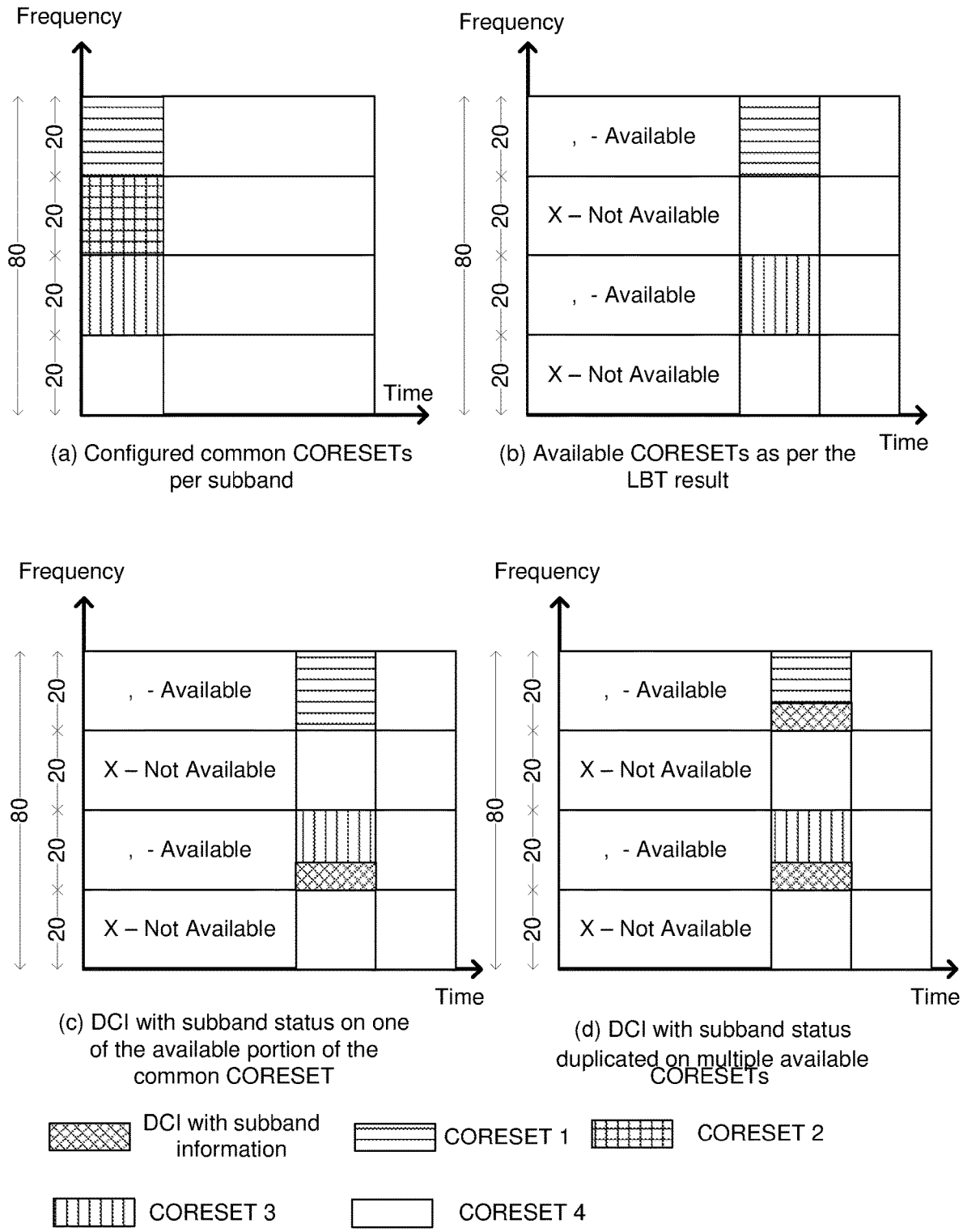
FIG. 5 shows another example sub-band status information transmission using sub-band CORESET(s)

FIG. 5 shows one alternate design to convey the simplified DCI with sub-band indication. Instead of configuring a common wideband CORESET, the base station can configure multiple CORESETs, each of which may be sub-band localized. FIG. 5 (*a*) shows this design where four CORESETs are configured in four sub-bands. This Figure shows that each CORESET is covering the sub-band bandwidth but the base station can choose a smaller size. It is also possible to group sub-bands for a single CORESET. After conducting the LBT, the base station finds itself in a situation where only the CORESET 1 and CORESET 3 are usable as shown in FIG. 5 (*b*). FIG. 5 (*c*) shows the setting where the base station uses only CORESET 3 for common DCI transmission containing the sub-band status information. FIG. 5 (*d*) shows the variation where the base station transmits the common DCI on both CORESET 3 and CORESET 4 for a more reliable and faster detection of this DCI at the users. FIG. 5 shows, by way of example, that the CORESETs are configured in all sub-bands of the wideband carrier and that the network can configure CORESETs in a subset of sub-bands. Similarly, the network can choose a different bandwidth for the CORESETs and it is not mandatory that it is equal to the sub-band bandwidth.

One important aspect related to sub-band status indication is how to encode this information. In one embodiment, the patterns of used and unused sub-bands may be tabulated. There can be different tables for different bandwidths of wideband carrier. As the users are configured with the carrier, and the bandwidth is part of the configuration, they know which table is the relevant one. Then the base station can send the row index of the pattern which is active for the current transmission interval. This can be helpful to contain the number of bits required to convey the sub-band status to a certain number of bits. With the increase in the number of sub-bands for very wide bandwidth carriers, if all combinations of active/used and unused sub-bands have to be supported, more bits may be required and, in such cases, these tables can be helpful to allow certain patterns and reduce the number of bits to be sent in the common DCI to a desired number.

Another embodiment includes encoding the sub-band usage status information for higher flexibility. In this embodiment, the encoding of the sub-band status information can be in the form of a bitmap where each bit conveys the status of a sub-band being used or not. This provides full flexibility and any combination of used and unused sub-bands can be supported and communicated to users through this encoding.

In events when only a subset of sub-bands happens to be available for transmission within a wideband carrier, it is possible that the resources configured for some important control information transmission are not available in this transmission occasion. The examples of these resources could be the resources for the transmission of cell specific control channels, like synchronization sequence blocks (SSBs) and paging channel in the DL direction, and the random-access channel (RACH) in the UL direction. Now the question is how to handle the transmission of these signals/channels when the resources configured for them are partially/fully not available in the current COT. As an example, if the paging resource is not available or only partially available, the base station may not send the paging information relevant for users. Similarly, if RACH resource becomes unavailable, the users cannot transmit RACH sequence and they would not be able to make the resource request for uplink transmissions or cannot request system information etc.

For the problem of control resources becoming unavailable due to sub-bands unavailability, different solutions can be enforced for standalone and non-standalone unlicensed carriers. If the wideband carrier is operating in non-standalone mode, the users are connected to an anchor carrier in the licensed band. In this case, if the users get the information that the resources for the necessary control information (SSB, paging and RACH etc) are not available in the current COT, the resources are neither shifted on the wideband unlicensed carrier nor new resources are assigned for these signals. The users are supposed to make use of the resources configured on the anchor carrier for the transmission/reception of these signals. This may give rise to some additional delays for transmission/reception of control information but could simplify the operation and reduces the need to exchange information and adjust these resources dynamically on the unlicensed carrier. Having said that, the transmission/reception of these signals/channels on the anchor carrier will not replace the purpose of SSB, as it provides synchronization in time-frequency, a means to estimate channel quality and also provides some essential broadcast information. On the other hand, the SSB transmission is done periodically on specific time and frequency locations and thus even without this sub-band problem of wideband carrier would be disturbed due to uncertain nature of the unlicensed medium in time domain. Therefore, instead of making variations in time and frequency intervals of SSB transmission, it may be wise to not transmit SSB in transmission occasions where the resources of SSB fall in unavailable sub-bands.

For the unlicensed standalone mode, the support of anchor licensed carrier is not assumed to be there. In this case, the absence of control resources due to unavailable sub-bands means the users have no means to receive or transmit important control information. Thus, for the standalone mode, the important control resources must be shifted, adjusted or new resources be configured dynamically over the currently available sub-bands for proper network operation. In one embodiment, static settings may be decided a-priori how the resources will shift or new resources will be configured for these important signals. One example can be that if the SSB is transmitted in a sub-band which is not available, it would be transmitted in the nearest available sub-band. If two sub-bands happen to be available at equal distance, one in the lower frequency range and one in the upper frequency range, the one with the lower frequency range will be selected. This is an example setting but different static decisions can be agreed and as soon as the users are informed about the active sub-bands, they know where the control resources will get displaced to. Similar approach can be applied to other important control resources like used for paging in the DL and for RACH in the UL. This allows limiting the information exchange overhead but in turn may lack flexibility.

A more flexible approach can be adopted where the base station dynamically indicates the row entry of a mapping table which indicates to users about the shift of such control resources. These tables can either be prepared a priori with a set of options about how the resources shift with different sub-band patterns and hence known to base stations and users. To keep the things even more flexible, the base station can be allowed to configure such mapping tables by higher layer signalling such as RRC signalling and then indicate the selected row entry by dynamic signalling like DCI. In case, a simplified DCI is selected to convey the status of used and unused sub-bands, this DCI can further include this information field indicating the mapping about the important control resources. As there happens to be multiple resources, like SSB, paging, PRACH etc, each of these important control information resources shift indication can be allocated a dedicated field in the simplified DCI.

The sub-band status information for unlicensed wideband carrier does not need to be transmitted in each COT. When there are no competing devices and the base station and its users are able to have successful LBTs most of the time over all the sub-bands of the wideband carrier, the activation status of the constituent sub-bands needs not be conveyed. This can be controlled by having an RRC parameter as part of the configuration of the wideband unlicensed carrier with default value set to be not configured. One the other hand, when the network situation is such that the base station and its users are surrounded by other devices which might be operating on different system bandwidths, the base station will find often the channel sensing results where it finds only a subset of sub-bands available for transmission. In such situations, the base station can configure the common CORESET and start transmitting this simplified DCI carrying the sub-band status information.

Another embodiment includes further reducing the transmission overhead of this simplified DCI. The base station even after having configured the common CORESET may transmit this DCI in the COTs when it uses a strict subset of the sub-bands of the wideband carrier. Thus, whenever it is able to use the full bandwidth of unlicensed wideband carrier, it sends no sub-band status information. As the users do not know a-priori after the configuration of the common CORESET, whether base station channel sensing will lead to the usage of full bandwidth of the wideband carrier or a subset of the sub-bands, they may always need to search for this simplified common DCI. To reduce the blind decoding attempts, the search space for this simplified DCI can be designed with very limited PDCCH candidates to save the blind decodes at the UEs. Thus, the users when configured to listen to common CORESET(s) for sub-band status indication can try to find this simplified DCI (PDCCH). If they find the DCI, they get to know the used sub-bands for the current COT. If they don't find the simplified DCI, they conclude that all the sub-bands are available in this transmission occasion and they resort to their normal operation of finding the scheduling DCIs in their configured CORESETs.

In addition to carrying the sub-band indication for the unlicensed wideband carrier, the simplified DCI can carry some other COT relevant useful information. This can include for example operator identification, cell identity for the base station, COT identification, duration of the COT, subcarrier spacing and the UL/DL split etc. UL/DL split pattern can be useful for the UEs in the cell to know the duplexing over the carrier. Operator and cell identification along with the COT duration are very useful not only for the UEs in the cell but also for other neighbouring base stations of the same operator to improve the frequency reuse. They can further be helpful for the base stations of other operators for better coordination or if they want to avoid doing the LBTs during the current COT duration of a base station from which they would see their LBTs failing due to its ongoing transmissions.

The second approach includes indicating the active sub-bands of wideband carrier in the COT with preamble(s).

In some embodiments, indicating the active sub-bands of a wideband carrier is achieved through transmission of preamble(s) for each active sub-band. This approach is very elegant and provides many advantages. One important advantage is the simplified processing for the receiving devices. The UEs don't need to do full baseband processing and channel decoding to get to know which sub-bands are active and which sub-bands of the wideband carrier are not active in the current COT. The UEs can employ simple correlators which do correlations with the known preamble sequences for each sub-band without activating the whole receive chain, and thus the identification of active sub-bands of the wideband carrier can be done via the detection of preambles based on applying simple energy detection thresholds to received correlation energies. Apart from indicating the active sub-bands of the unlicensed wideband carrier, the preamble transmission will simplify significantly the detection of the start of unlicensed transmission interval or COT for a group of devices like users in the cells with a huge benefit from power dissipation perspective. The transmission of preamble for all active sub-bands has an additional advantage in terms of satisfying the constraint of transmitting energy over 80% of the nominal bandwidth. Of course, the preamble within each sub-band further needs to be designed and transmitted such that it does not leave the large unused frequency regions within each sub-band.

To reduce the overhead of transmitting preambles for all the sub-bands of the wideband carrier for each occasion, the network can choose to send a single preamble when all the subbands of the wideband carrier are found to be available. On the other hand, when only a subset of the sub-bands is available, the network transmits the preamble for each sub-band. The design of a single preamble for the wideband carrier and a preamble per sub-band can be different. In one example, the single preamble for the wideband carrier can be transmitted over larger frequency resource compared to the frequency resource for the sub-band preamble, which has to be limited within the BW of the sub-band.

The preambles can be selected based upon the well-known Zadoff-Chu sequences for their known time-frequency auto-correlation and cross-correlation properties. For this reason, they were chosen as the cell synchronization sequences in 4G LTE systems.

Another good class of preambles can be based upon m-sequences (maximum length sequences) or their variations like Gold codes. These sequences also have very good auto- and cross-correlation properties and have been chosen as the synchronization sequences in the 5G NR systems.

Instead of transmitting the preamble for each used sub-band, a different way to indicate the used sub-bands could be based upon transmission of a single preamble with some limited information embedded with the preamble. One way to achieve this is to transmit a preamble among the set of possible preambles where the choice of the preamble indicates the active pattern of the used sub-bands in the current COT. Another example preamble design can be based upon Zadoff-Chu sequence where the root of the preamble sequence stays the same for a base station whereas different cyclic shifts convey the information about the active sub-bands of the current COT. Of course, this will require that the mapping of cyclic shifts to used sub-band pattern is a-priori known to both the base station and the UEs. Apart from the sequence design, one important question is the location where single preamble will be transmitted. In one embodiment, the network can transmit the single preamble on the resources which are aligned with SSB transmission. They need not necessarily be the same length as of the SSB (12 RBs for PSS/SS or 20 RBs for PBCH) but can have the centre aligned with the SSB transmission. In another embodiment, the network can choose a different location for single preamble transmission. With wideband carriers, it would be important to handle where the single preamble will be transmitted if the resources where it was supposed to be transmitted have fully or partially overlap with a sub-band which is not available in the current COT. For these cases, it would be judicious to contain the complexity of preamble detection at the users to have few pre-defined shifts which network will try to use for preamble transmission. In one example if the sub-band where preamble is supposed to be is not available, the network may shift the preamble transmission to nearest available sub-band. Further a priority can be decided if the shift would be to a sub-band to higher or lower sub-bands if both happen to be available.

This way of single preamble transmission would save the cost of transmitting the preamble in terms of energy and transmission resource compared to where the preamble is transmitted for each used sub-band.

The first and second approaches described above have been proposed to let the users know dynamically the used sub-bands of a wideband carrier in each COT. The first approach comprises sending this information in a control message, which can be sent in a simplified DCI mapped so as to improve the detection possibility even with uncertainty about which sub-bands will be used. The second approach comprises used sub-band identification through transmission of preamble(s), which can either be transmitted within each used sub-band or a single preamble with some modulated information can convey the used sub-band information.

It turns out that both approaches have some inherent technical advantages, which may include some elements complementary to each other. To name a few, the simplified DCI based approach does not need any new mechanism to convey the used sub-band information. Further, there are some other necessary COT structure relevant information which can be conveyed with this common DCI. Preamble based sub-band indication has the biggest advantage in facilitating the detection of the start of COT, in addition to indicating which of the sub-bands are active in the current transmission occasion. Due to these complementary benefits shown by these two approaches, it would make sense to combine these two mechanisms. First of all, it would provide improved reliability for the active sub-band indication for the wideband carrier. Secondly, it would provide all the advantages of the two approaches which will simplify greatly the start of the TxOP detection and the indication of other important COT relevant information.

For an unlicensed wideband carrier, when only a subset of sub-bands forming the wideband carrier are used, the users need to know the used sub-bands for an effective operation. Moreover, the control information and the data transmission need some special handling due to the fact that only a subset of the sub-bands are used within the configured wideband carrier in the current transmission occasion.

Some embodiments consider, in particular, control and data transmission when a subset of sub-bands is active in a wideband carrier. After knowing the used sub-bands in the COT, the UEs need to blindly decode further PDCCHs to find out if the base station has sent some scheduling/control information intended to this user. The CORESET design is very flexible in NR systems. A CORESET is a base station (or network) configured time-frequency resource in which the UEs try to decode candidate control channels using one or more search spaces. Contrary to 4G LTE systems, where the control region occupies first 2 or 3 symbols of the slot, 5G NR gives a lot of flexibility in choosing the resource size and their periodicity. To handle the uncertainty of some sub-bands becoming unavailable in certain transmission occasions in unlicensed wideband carrier, the base station can either configure large CORESETs for the users, spanning multiple sub-bands, so that even some sub-bands becoming unavailable in a certain transmission occasion, the UEs can still be sent control information for scheduling and other purposes. Upon knowing which sub-bands are available in the COT, the UEs know which blind decodes may potentially contain their relevant control information and they don't process the PDCCH candidates of the unused sub-bands.

When the base station has to send a PDCCH to a UE with very large aggregation level, using large amount of control resources, it is possible that the PDCCH crosses the sub-band boundary. If the used sub-bands of the wideband carrier happen to be non-contiguous, the base station can map the remaining PDCCH information, the remaining control channel elements (CCEs), on the next available sub-band, and the UE, having received the sub-band indication, can extract this information from the next available sub-band. Here to keep the processing complexity relatively simple, it would help to not use the interleaved mapping for mapping of CCEs to control resource groups, so called resource element groups, when the CCE mapping is done across the non-contiguous sub-bands.

The base stations can employ another setting where multiple CORESETs are configured localized in different sub-bands. The users, upon knowing the sub-band indication for the COT, know which CORESETs lie in the used sub-bands and only do the blind decodes in these CORESETs to find their relevant control information.

Configuration of wideband CORESET or configuration of multiple CORESETs helps to ensure the presence of at least some search spaces and PDCCH candidates where UEs may receive their PDCCH even when some sub-bands are not used, this though may create an issue of the availability of large number of PDCCH candidates when all the sub-bands are available. To overcome this issue, one method can be to introduce some grouping over the CORESETs or the search spaces such that certain CORESETs/search spaces will be used only when the wideband carrier is not used with all of its sub-bands.

When the active sub-bands are located contiguous to each other, this somehow simplifies the scheduling related aspects. On the other hand, when these sub-bands are not contiguous, scheduling related control information transmission becomes complicated. For the frequency resource assignment, there are two types of allocation defined in NR (see 3GPP TS38.214 for details). One is type 0 where a bitmap-based pattern indicates the RBs allocated to the user. This provides full scheduling flexibility but the overhead can be enormous when the number of resource blocks is large. In this assignment method, it is also possible to regroup contiguous RBs, and then the size of bitmap will reduce with the same fraction as the size of the RB group. For the frequency resource assignment type 1, a starting PRB and length is indicated. This method has certain limitations for the scheduler but reduces the resource assignment overhead. The limitation is that only localized virtual resource blocks can be allocated to a user. This limitation can be relaxed to some extent by making the mapping from virtual resource blocks to physical resource blocks in an interleaved fashion.

For the DL or UL scheduling when a subset of sub-bands is used, the network can choose type 0 and indicate precisely the RBs or groups of RBs scheduled for the UE. The base station can use type 1 allocation but in case the scheduled resources cross an unused sub-band, the user is required to use the resources from the next available sub-band as its scheduled resources. To keep the things simple from user perspective and to avoid defining new patterns of interleaving, it would also make sense to restrict the virtual RB to physical RB mapping only in localized fashion, i.e., the network does not use the interleaving for VRB to PRB mapping for wideband carriers in the COTs when at least one of the sub-bands is not available among the sub-bands of the wideband unlicensed carrier.

There is an additional mechanism of frequency hopping employed in UL transmissions to improve the frequency diversity benefit. For the same reason that some sub-bands may not be available in certain occasions and that might require defining new patterns for frequency hopping and complicate the specification and the base station scheduling, our proposal is to not allow frequency hopping in the COTs when at least one of the sub-bands of a wideband carrier is not available for transmission.

Some embodiments consider, in particular, an approach based on wideband transmissions with bandwidth part (BWP) and efficient signalling. For an unlicensed wideband carrier, when only a subset of sub-bands forming the wideband carrier are used, the users need to know the used sub-bands for an effective operation. One method to manage these issues can be by network configuring multiple BWPs (overlapping and non-overlapping) spanning the wideband carrier. 5G NR allows the network to configure multiple BWPs for each user which can be overlapping or non-overlapping. One restriction in NR is though that only one single BWP can be active for each user. When the gNB does channel sensing on this wideband and finds itself in a situation when only some sub-bands are found to be active, it can change the BWPs of the users so that maximum of them get aligned to the used sub-bands in this occasion. 5G NR allows changing the BWP for each user through higher layer RRC signalling or through dynamic physical layer signalling by putting the BWP indication in the DCI.

One issue with the above approach is the higher signalling overhead required for BWP change. Both methods currently standardized in NR for BWP change are user specific. To reduce the signalling burden, it would be important to define some sort of common or group common signalling for BWP change indication. Another issue with such user specific methods of BWP change is higher latency. A significant time duration of the current transmission opportunity or COT will get consumed in configuring the users to new BWPs which correspond to success of LBT in different sub-bands. This will reduce the effective time where the base station and the users can communicate in this occasion.

One method to overcome such shortcomings is that the gNB (the network) configures multiple BWPs to each user but these BWPs are either exactly the same for these users or very closely identical. Furthermore, their identifiers (for example BWP identity) are also same when configured to users. This means that if there is a common signalling from the gNB which tells the users to shift their BWP to "BWP#n", all the users shift to a different BWP which has been configured to them a-priori by the gNB with identifier "n". This method of configuring the same BWPs to multiple users and indicating the change of BWP through a common indication to a group of users can bring a lot of technical benefit by reducing the signalling load. One additional advantage is achieved in the latency. The common signalling in the beginning of the COT would let the users move to new BWP quicker than compared to if they have to receive the information individually one by one in DCI. The RRC signalling, on the other hand, would involve even larger delay than DCI based signalling.

One important design decision for this strategy is where to transmit this common signalling for BWP change when some of the sub-bands may not be available. This common signalling can be sent in the simplified DCI with other COT relevant information in the current BWP for the users. The current BWP at the beginning of the COT may span the whole wideband carrier or a large frequency portion to ensure the transmission/reception of this simplified DCI. The other rules to facilitate detection, like smaller search space or reduced number of PDCCH candidates, can be employed for the transmission of this simplified DCI as detailed above (see first approach of simplified DCI).

Figure 6:
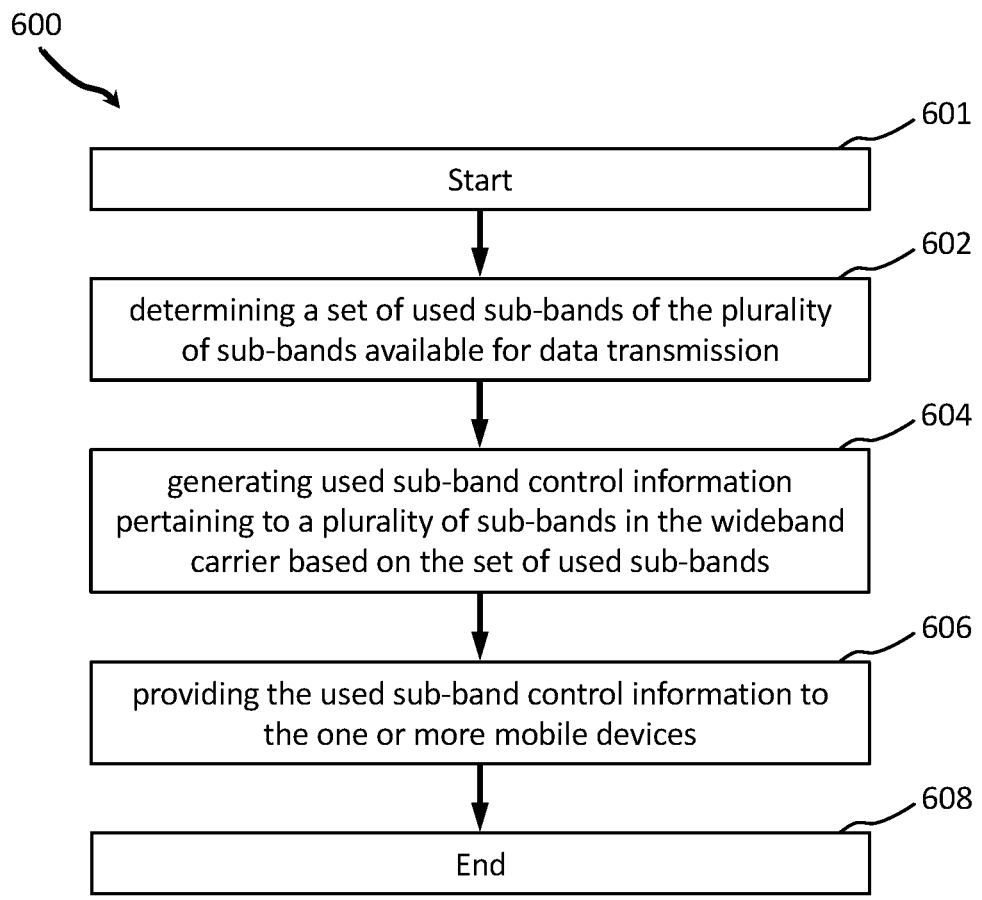
FIG. 6 shows a flowchart of a method of data transmission.

FIG. 6 shows a flowchart of a method 600 of data transmission. The method 600 pertains to data communication in a cellular communications network based on an unlicensed wideband carrier. The method 600 is performed by a base station of the cellular communications network, the base station being in communication with one or more mobile devices. The method starts at step 601. In step 602, a set of sub-bands to be used for data transmission in the current COT is determined of the plurality of available sub-bands within the wideband carrier. In step 604, used sub-band control information pertaining to a plurality of sub-bands in the wideband carrier based on the set of sub-bands to be used is generated. In step 606, the used sub-band control information is provided to the one or more mobile devices. The method 600 ends at step 608.

The signal processing functionality of the embodiments of the invention especially the gNB and the UE may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally 45 referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

The non-transitory computer readable medium may comprise at least one from a group consisting of: a hard disk, a CD-ROM, an optical storage device, a magnetic storage device, a Read Only Memory, a Programmable Read Only Memory, an Erasable Programmable Read Only Memory, EPROM, an Electrically Erasable Programmable Read Only Memory and a Flash memory. In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices.

Thus, the elements and components of an embodiment of the invention may be physically, functionally and logically implemented in any suitable way. Indeed, the functionality may be implemented in a single unit, in a plurality of units or as part of other functional units. Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognise that various features of the described embodiments may be combined in accordance with the invention. In the claims, the term 'comprising' or "including" does not exclude the presence of other elements.

The invention claimed is:

1. A method of data communication in a cellular communications network based on an unlicensed carrier, the method performed by a base station of the cellular communications network, the base station being in communication with one or more mobile devices, the method comprising the steps of:

determining a set of sub-bands to be used of the plurality of sub-bands available for data transmission;

generating used sub-band control information pertaining to a plurality of sub-bands in the carrier based on the set of sub-bands to be used; and providing the used sub-band control information to the one or more mobile devices, wherein providing the used sub-band control information to the one or more mobile devices includes:

generating downlink control information (DCI) including the used sub-band control information; and transmitting the DCI, in a group-common manner, wherein the DCI is configured to include the information of the used sub-bands in a bitmap-based signalling where each bit of the bitmap provides a usage status of a sub-band in a channel occupancy time (COT) included with a COT identification and/or a COT duration;

wherein providing the used sub-band control information to the one or more mobile devices includes:

generating one or more preambles based on the set of used sub-bands; and transmitting the one or more preambles;

wherein the one or more preambles include single preamble, and the single preamble includes control information indicative of an active pattern of used sub-bands in a COT.

2. The method according to claim 1, wherein determining the set of sub-bands to be used of the plurality of sub-bands available for data transmission includes determining the set of used sub-bands based on selecting a sub-set of the set of available sub-bands, based on a pattern of available and unavailable sub-bands of the plurality of sub-bands.

3. The method according to claim 1, wherein generating downlink control information (DCI) including the used sub-band control information includes configuring a common control resource set (CORESET) over the wideband carrier, the CORESET encompassing the set of available sub-bands.

4. The method according to claim 1, wherein transmitting the DCI is performed at the beginning of the COT, transmitting the DCI being repeated multiple times within the COT duration.

5. The method according to claim 1, wherein transmitting the DCI further comprises repeating the DCI in one or more sub-bands of the set of available sub-bands.

6. The method according claim 3, further comprising restricting search spaces in the configured CORESET with a limited number of physical downlink control channel (PDCCH) candidates.

7. The method according to claim 1, wherein the cellular communications network is configured to transmit the single preamble based on resources which are aligned with synchronization signal block (SSB) transmission.

8. The method according to claim 1, wherein a root of the one or more preambles stays the same for the base station and wherein different cyclic shifts include control information indicative of an active pattern of used sub-bands in a COT.

9. A method of data communication in a cellular communications network based on an unlicensed carrier, the method performed by a base station of the cellular communications network, the base station being in communication with one or more mobile devices, the method comprising the steps of:

determining a set of sub-bands to be used of the plurality of sub-bands available for data transmission;

generating used sub-band control information pertaining to a plurality of sub-bands in the carrier based on the set of sub-bands to be used; and providing the used sub-band control information to the one or more mobile devices, wherein providing the used sub-band control information to the one or more mobile devices includes:

generating downlink control information (DCI) including the used sub-band control information; and transmitting the DCI, in a group-common manner, wherein the DCI is configured to include the information of the used sub-bands in a bitmap-based signalling where each bit of the bitmap provides a usage status of a sub-band in a channel occupancy time (COT) included with a COT identification and/or a COT duration;

wherein providing the used sub-band control information to the one or more mobile devices includes:

generating one or more preambles based on the set of used sub-bands; and transmitting the one or more preambles;

wherein a root of the one or more preambles stays the same for the base station and wherein different cyclic shifts include control information indicative of an active pattern of used sub-bands in a COT.

10. The method according to claim 9, wherein determining the set of sub-bands to be used of the plurality of sub-bands available for data transmission includes determining the set of used sub-bands based on selecting a sub-set of the set of available sub-bands, based on a pattern of available and unavailable sub-bands of the plurality of sub-bands.

11. The method according to claim 9, wherein generating downlink control information (DCI) including the used sub-band control information includes configuring a common control resource set (CORESET) over the wideband carrier, the CORESET encompassing the set of available sub-bands.

12. The method according to claim 9, wherein transmitting the DCI is performed at the beginning of the COT, transmitting the DCI being repeated multiple times within the COT duration.

13. The method according to claim 12, further comprising restricting search spaces in the configured CORESET with a limited number of physical downlink control channel (PDCCH) candidates.

14. The method according to claim 9, wherein transmitting the DCI further comprises repeating the DCI in one or more sub-bands of the set of available sub-bands.

15. The method according to claim 9, wherein the one or more preambles include single preamble, the single preamble including control information indicative of an active pattern of used sub-bands in a COT.

16. The method according to claim 15, wherein the cellular communications network is configured to transmit the single preamble based on resources which are aligned with synchronization signal block (SSB) transmission.

* * * * *